US012717710B2

(12) United States Patent
Park

(10) Patent No.: US 12,717,710 B2
(45) Date of Patent: Aug. 25, 2026

(54) APPARATUS AND METHOD WITH COMPRESSED MEMORY

(71) Applicant: SAMSUNG ELECTRONICS CO., LTD., Suwon-si (KR)

(72) Inventor: Seongwook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/082,781

(22) Filed: Mar. 18, 2025

(65) Prior Publication Data

US 2026/0104993 A1 Apr. 16, 2026

(30) Foreign Application Priority Data

Oct. 16, 2024 (KR) ........................ 10-2024-0141500

(51) Int. Cl.

*G06F 12/02* (2006.01)
*G06F 3/06* (2006.01)
*G06F 12/10* (2016.01)

(52) U.S. Cl.

CPC .......... *G06F 12/023* (2013.01); *G06F 3/0608* (2013.01); *G06F 3/064* (2013.01);
(Continued)

(58) Field of Classification Search

CPC ........ G06F 12/023; G06F 12/04; G06F 12/02; G06F 12/08; G06F 12/10; G06F 12/1009;
(Continued)

(56) References Cited

U.S. PATENT DOCUMENTS 10,572,378 B2 2/2020 Li et al.
10,970,203 B2 4/2021 Sokol, Jr.
(Continued)

FOREIGN PATENT DOCUMENTS

GB 2581836 A 9/2020
KR 10-2018-0041898 A 4/2018
(Continued)

OTHER PUBLICATIONS

Korean Office Action issued on Jan. 5, 2026, in counterpart Korean Patent Application No. 10-2024-0141500 (4 pages in English, 7 pages in Korean).

*Primary Examiner* — Michael Krofcheck
(74) *Attorney, Agent, or Firm* — NSIP Law

(57) ABSTRACT

A method of managing compressed memory includes: receiving a memory command to read compressed data from the compressed memory by decompression thereof by the compressed memory or to write data that is to be compressed and stored by the compressed memory; obtaining, based on the memory command, allocated-state information indicating allocation states of respective slots of the compressed memory; obtaining a slot address of a slot corresponding to the received memory command using bits of a bitmap indicating allocation states of the respective slots and using tags of respective groupings of the bits in the bitmap; translating, based on the obtained slot address, an address for writing or reading the data of the memory command; and compressing or decompressing the data of the memory command based on the translated address.

20 Claims, 11 Drawing Sheets

(52) U.S. Cl.
CPC ............ *G06F 3/0673* (2013.01); *G06F 12/10* (2013.01); *G06F 2212/401* (2013.01); *G06F 2212/657* (2013.01)

(58) Field of Classification Search
CPC ........... G06F 12/1027; G06F 2212/401; G06F 2212/657; G06F 3/0608; G06F 3/064; G06F 3/0638; G06F 3/0673; G06F 3/0631
See application file for complete search history.

(56) References Cited

U.S. PATENT DOCUMENTS

| | | | | |
|---|---|---|---|---|
| 11,176,031 | B2 | 11/2021 | Siebert | |
| 2004/0054858 | A1* | 3/2004 | Chandrasekaran | G06F 3/0608 707/E17.005 |
| 2009/0327621 | A1 | 12/2009 | Kliot et al. | |
| 2013/0246721 | A1* | 9/2013 | Fukutomi | G06F 3/0679 711/155 |
| 2022/0253236 | A1* | 8/2022 | Zhang | G06F 3/0679 |
| 2024/0036726 | A1 | 2/2024 | Erickson et al. | |
| 2025/0307189 | A1* | 10/2025 | Medeiros | G06F 13/28 |
| 2025/0370619 | A1* | 12/2025 | Shin | G06F 3/0608 |

FOREIGN PATENT DOCUMENTS

| | | | |
|---|---|---|---|
| KR | 10-2021-0133257 | A | 11/2021 |
| KR | 10-2022-0116650 | A | 8/2022 |
| KR | 10-2024-0057906 | A | 5/2024 |

* cited by examiner

300

| Slot 0 Address | Slot 1 Address | Slot 2 Address | Slot 3 Address | Slot 4 Address | Slot 5 Address | Slot 6 Address | Slot 7 Address |
|---|---|---|---|---|---|---|---|

APPARATUS AND METHOD WITH COMPRESSED MEMORY

CROSS-REFERENCE TO RELATED APPLICATIONS

This application claims the benefit under 35 USC § 119(a) of Korean Patent Application No. 10-2024-0141500, filed on Oct. 16, 2024, in the Korean Intellectual Property Office, the entire disclosure of which is incorporated herein by reference for all purposes.

BACKGROUND

1. Field

The following description relates to an apparatus and method with compressed memory.

2. Description of Related Art

Memory compression technology used in virtual memory systems. Typically, a virtual memory system manages a main memory by dividing the main memory into pages. In a virtual memory system, to provide a memory space with a size larger than the capacity of available physical memory (e.g., a random access memory (RAM)), the virtual memory system may leave frequently used pages in the RAM, move pages that have not been used for a long time to a disk or the like, where pages are stored in a swap file. When the pages stored in the swap file need to be used again, the virtual memory system performs paging, where old pages in the RAM are exported to the swap file and necessary pages are loaded to the RAM.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a compressed memory device includes processing hardware configured to: receive a memory command from a host processor, and compress or decompress data of the memory command; perform address translation for writing or reading of the data of the memory command; and provide allocated-state information indicating allocation states of respective slots of the compressed memory for the address translation, and manage allocation and deallocation of the slots, wherein the managing allocation and deallocation of the slots includes providing a slot address corresponding to the memory command of the host processor for the address translation by using bits of a bitmap indicating allocated states of the respective slots and tags representing respective groupings of the bits in the bitmap.

Based on the memory command being a write command, an address of a new slot may be received, to which may be allocated data of the write command compressed by the compressed memory device, metadata of the compressed data may be updated.

Based on the memory command being a read command, a physical address of a slot may be obtained, the slot may be where compressed data corresponding to the read command is already allocated, and the physical address of the slot may be obtained from metadata of the compressed data.

A slot, to which data is not allocated, may be searched for using the bits of the bitmap, and a physical address of the searched-for slot may be translated.

A bitmap representing a slot to which data is not allocated may be identified using a tag whose bits represent the groupings of the bits of the bitmap, respectively.

Each of the slots may have a variable memory size, and each of the slots may be managed through the bitmap.

A slot queue may be configured to manage slots to which data is allocated and slots to which data is not allocated, through the bitmap, and the bitmap may be searched to determine addresses of the slots.

A tag buffer may be used to search the bitmap for a bit corresponding to a slot to which data is not currently allocated, using a tag bit stored in the tag buffer.

In response to a slot request for storing data being received, the slot queue may be configured to search for the tags.

The slot queue may be configured to, in response to a bit in the bitmap being identified according to the search result, calculate a physical address of a slot, to which the data is to be allocated, using a physical offset address and a position of the bit in the bitmap.

The slot queue may be configured to provide the calculated physical address for address translation, and update, in the bitmap, a bit of a slot corresponding to the physical address.

The slot queue may be configured to update the tag bit according to an update of the bitmap bit, and in response to there being no bits in the bit's grouping indicating an unallocated slot, update the tag bit to indicate that all slots of the grouping are allocated, and dequeue the tag from the slot queue.

In another general aspect, a method of managing compressed memory includes: receiving a memory command to read compressed data from the compressed memory by decompression thereof by the compressed memory or to write data that is to be compressed and stored by the compressed memory; obtaining, based on the memory command, allocated-state information indicating allocation states of respective slots of the compressed memory; obtaining a slot address of a slot corresponding to the received memory command using bits of a bitmap indicating allocation states of the respective slots and using tags of respective groupings of the bits in the bitmap; translating, based on the obtained slot address, an address for writing or reading the data of the memory command; and compressing or decompressing the data of the memory command based on the translated address.

The obtaining of the slot address may include: in response to the memory command being a write command, receiving an address of a new slot, to which compressed data is to be allocated, and updating metadata of the compressed data.

The obtaining of the slot address may include: in response to the memory command being a read command, obtaining a physical address of a slot, to which compressed data corresponding to the request to read is allocated, from metadata of the compressed data.

The obtaining of the slot address may include: searching for a slot, to which data is not allocated, using the bits of the bitmap, and performing address translation on a physical address of the found slot.

The obtaining of the slot address may include: identifying a bit in the bitmap indicating a slot to which data is not allocated, using a tag of the groupings of the bits in the bitmap.

The obtaining of the slot address may include: managing slots to which the data is allocated and slots to which data is not allocated through the bitmap using a slot queue, and searching for addresses of the slots.

The obtaining of the slot address may include: searching for a bit in the bitmap corresponding to a slot, to which data is not allocated, using a tag bit stored in a tag buffer.

The memory command may be a write command for writing a memory page, and the memory page may be stored in multiple of the slots.

In another general aspect, an electronic device includes: a host processor; a compressed memory configured to receive a memory command and a compressor configured to compress or decompress data associated with the memory command; an address translator configured to perform address translation for writing or reading of the data associated with the memory command; a slot allocation device configured to provide allocated-state information of slots in the compressed memory to the address translator, and manage allocation of the slots or deallocation of the slots; and the compressed memory configured to store compressed data, and store pieces of information for managing the compressed data, wherein the slot allocation device is configured to transmit a slot address corresponding to a request of the host to the address translator by using bits of a bitmap indicating allocation states of the respective slots and by using tags of respective groupings of the bitmaps.

Figure 1:
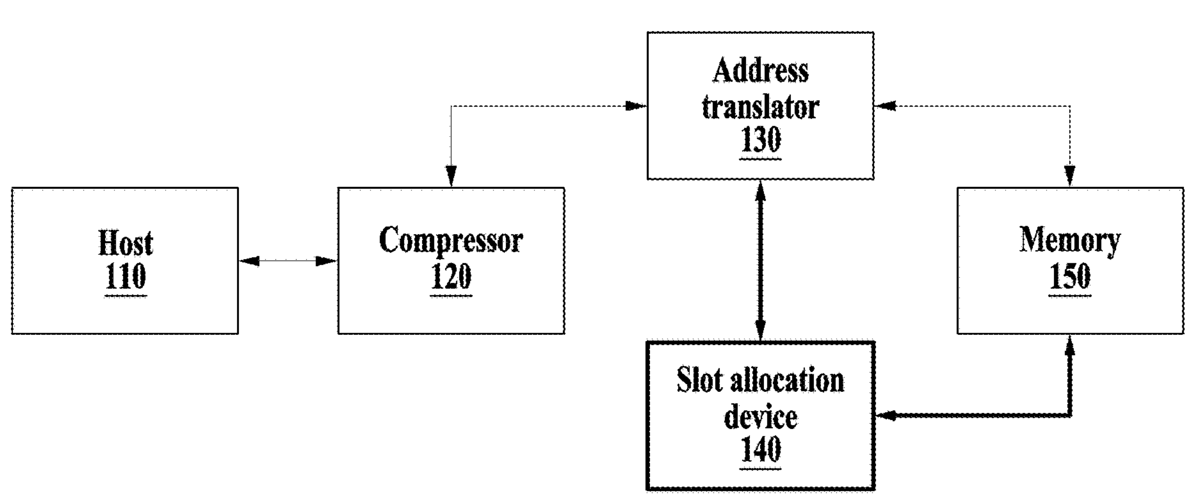
FIG. 1 illustrates an example of a computing device with compressed memory, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

A compressed memory method may involve a system and hardware technique for improving actual memory capacity by compressing and storing data using a compressor included in the system. The compressed memory method improves system performance by utilizing a memory space more efficiently.

Memory management systems typically provide virtual memory for managing data to be stored in a main memory by dividing the data into several pages. A virtual memory system may allow applications to use a memory space (or address space) larger than the capacity of random access memory (RAM) actually installed. A typical virtual memory system leaves frequently used pages in RAM, moves pages that have not been used for a long time to disk, and stores the pages in a form of a swap file. When the pages stored in the swap file need to be used again, the virtual memory system performs an operation of exporting old pages in the RAM to the swap file (swapping out) and loading the necessary pages to the RAM (swapping in), which is called paging.

However, this method may cause a host system to perform additional processing, which may result in resource consumption, decreased utilization, and degraded performance of the host system. That is, the more swapping that occurs, the less efficient the host system. In the related art, a technique is used that involves the host offloading an operation of storing compressed data to a buffer chip of a memory, which reduces the resource consumption of the host and improve system performance (the compression operation itself is offloaded).

FIG. 1 illustrates an example of a computing device with compressed device, according to one or more embodiments.

As illustrated in FIG. 1, one or more blocks and a combination thereof may be implemented by a special-purpose hardware-based computer that performs a predetermined function or a combination of computer instructions and special-purpose hardware.

Referring to FIG. 1, a computing device 100 with compressed memory may include a compressor 120, an address translator 130, a slot allocation device 140, and a memory 150.

According to an example, a host processor 110 may be a central processing unit (CPU), an application processor that is responsible for data processing and control, or the like. The host processor 110 may process various commands generated from application software or an operating system (OS), and perform data input and output and memory management. The host 110 may perform an operation of reading and writing data by directly communicating with the memory.

The computing device 100 may be implemented in various ways. For example, the computing device 100 may be configured in the form of a server, a desktop computer, a laptop computer, or an embedded system, for example. In whichever form, the computing device 100 may process data, communicate with a memory, and perform required operations in respective environments. For example, when implemented as a server, the computing device 100 may process requests from multiple users and manage data efficiently, and when implemented as an embedded system may perform specific functions required in a small device.

The compressor 120 according to an example may receive data and commands from the host processor 110 and compress and decompress data accordingly. For example, when the host 110 transmits data to the compressor 120 to save memory storage space, the compressor 120 compresses the data on-the-fly and transmits the compressed data to the memory 150. In addition, when the host processor 110 requests the compressed data, the compressor 120 may decompress the data and transmit the data to the host processor 110.

Data may be divided into pages, which are data units allocated to slots in the computing device 100. In examples described below, "data" and "page" are used interchangeably, but a page is used as one type of storage form for compressed data, and this is only for the convenience of describing the operation of the compressed memory device and is not limited thereto.

The address translator 130 according to an example may perform address translation for storing and searching for data. For example, when the host processor 110 stores data, the address translator 130 may determine a physical address to store the data, and store the data in a correct location.

When a request to write is received from the host processor 110, the address translator 130 may receive an address of a new slot, to which data compressed by the compressor 120 is to be allocated, from the slot allocation device 140, and update metadata of the compressed data. For example, when the data is being newly compressed, the address translator 130 may find and allocate a new slot in the memory, and update metadata information related thereto.

When a request to read is received from the host processor 110, the address translator 130 may obtain a physical address of a slot, to which compressed data corresponding to the request to read has been allocated, from metadata of the compressed data. For example, when the host processor 110 requests previously compressed data, the address translator 130 may find and read the physical address where the compressed data is stored from the slot allocation device 140.

The slot allocation device 140 may provide allocated-state information of slots to the address translator 130, and manage allocation and deallocation of the slots. Each of the slots may have a variable memory size, and the slot allocation device 140 may manage each of the slots through a bitmap (bit values of the bitmap indicting which of the slots are allocated and not allocated). For example, when a slot storing specific data is no longer needed, the slot allocation device 140 may deallocate the slot, and prepare the slot to be used by other data (e.g., by setting a corresponding bit in the bitmap, among other things). Each of the slots may have a variable memory size, and the slot allocation device 140 may manage each of the slots through the bitmap.

The slot allocation device 140 may transmit a slot address corresponding to a request of the host processor 110 to the address translator 130 by using bitmaps indicating allocated states of the slots and tags obtained by grouping the bitmaps. For example, a bit in a bitmap may indicate whether a corresponding slot is in use or is unallocated, and a tag may be a data structure for efficiently managing groupings of bits in the bitmap.

The slot allocation device 140 may use the bitmaps to search for an unallocated slot and transmit a physical address of a found slot to the address translator 130. For example, in order to find a slot in which data is to be stored, the slot allocation device 140 may search for an unallocated slot using the bits in the bitmap, and provide an address of the slot to the address translator 130.

The slot allocation device 140 may identify a bitmap including a slot (to which data is not allocated) using tags of respective groupings of the bitmaps. For example, when multiple bits of the bitmap are grouped and represented by a tag, the slot allocation device 140 may find an allocatable slot.

The slot allocation device 140 may include a slot queue. The slot queue may manage slots to which the data is allocated and slots to which data is not allocated, through the bitmap, and search for addresses of the slots. For example, the slot queue may distinguish an allocated slot and an empty slot using a corresponding bit in the bitmap, and find an address in the memory where the data is to be stored.

When a slot request for storing data is received by the address translator 130, the slot queue may search for the tags. For example, in order to find a new slot, to which data is to be stored, the slot queue may search for a tag indicating an empty/unallocated slot and find an empty/unallocated slot.

When a bitmap bit is identified by the search, the slot queue may calculate a physical address of a slot to which the data is to be allocated, and may do so using a physical offset address and a position of the bit in the bitmap. For example, after finding an empty slot in the bitmap, the slot queue may calculate the physical address of the slot, and allocate data.

The slot queue may transmit the calculated physical address to the address translator 130, and update a bitmap bit of the slot corresponding to the physical address (to indicate that the slot is now in an allocated state). For example, the slot queue may update the bitmap state (e.g., a bitmap bit) of the slot to after the data is stored in the slot.

The slot queue may update a tag bit according to an update of the bitmap bit. When the tag bit, after being updated, indicates that all slots are (of the corresponding grouping) are allocated, the slot queue may dequeue the tag from the slot queue. For example, when all slots (e.g., as indicated by of a tag bit of a corresponding grouping/bitline) are in use, the slot queue may dequeue a corresponding tag and a bitmap line, and find a new empty slot.

The slot allocation device 140 according to an example may include a tag buffer. The slot allocation device 140 may search for a bit in the bitmap corresponding to a slot, to which data is not allocated, and the searching may be performed using tag bits stored in a tag buffer. For example, the tag buffer may store tags to allow the slot allocation device 140 to quickly search for empty slots (e.g., find a grouping of bitmap bits, e.g., a bitline, having at least one bit indicating an unallocated slot).

The memory 150 according to an example may refer to an internal memory (e.g., a static random access memory (SRAM)) embedded in the compressed memory device 100, or an external memory (e.g., a dynamic random access memory (DRAM)). The memory 150 is a memory region for storing and managing compressed data, and may operate inside/outside the compressed memory device 100 together with the slot allocation device 140, the address translator 130, and the like. Therefore, the memory 150 may store compressed data, and store pieces of information for managing the compressed data.

For example, the external memory may store at least one of metadata, a bitmap, and compressed data divided into slot units. The internal memory may store tag data.

The memory 150 according to an example may manage the compressed data in the slot units, and track slot allocation states through the bitmap and the tag. In addition, the slot allocation device 140 may manage allocation and deallocation of slots in the memory 150, and the address translator 130 may perform an operation of reading and writing data using a slot address.

FIGS. 2A to 2D illustrate examples of a method of managing a compressed memory according to a related art.

Figure 2A:
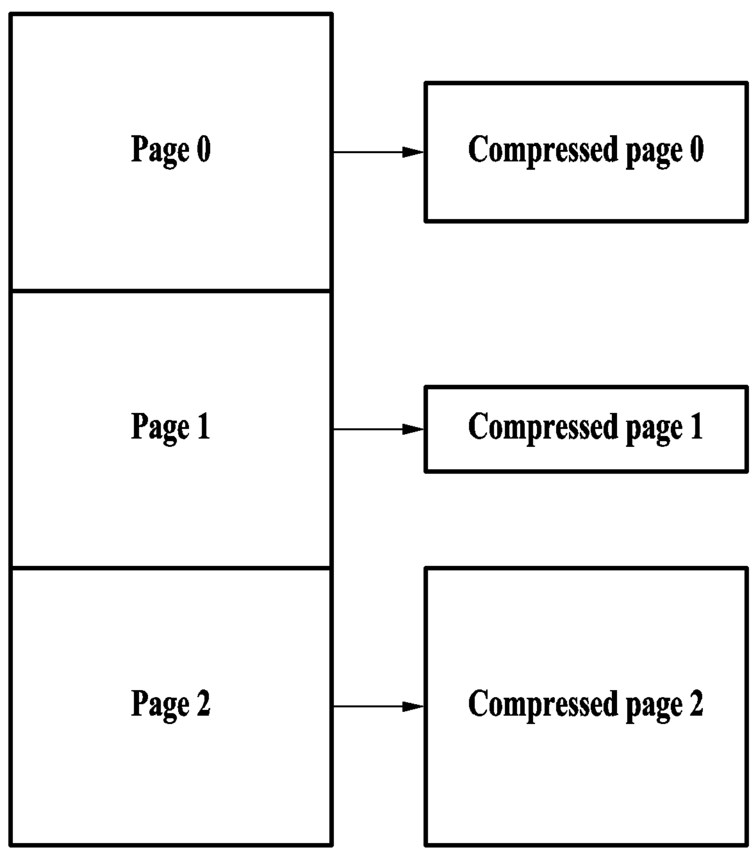
FIGS. 2A to 2D illustrate examples of a method of managing a compressed memory according to a related art.

FIG. 2A illustrates an example of variability of a size of a compressed page depending on data characteristics.

There are generally two types of operations in a compressed memory system. First, there may be a data compression operation. A compression ratio may be an important performance indicator in the data compression operation, and may indicate how much the size of original data may be reduced after data compression. Since algorithms with higher compression ratios may use a memory more efficiently, the compression ratio may be a factor that determines the performance of the compressed memory system.

Referring to FIG. 2A, a relationship between a page and a compressed page may be seen. For example, a page 0, a page 1, and a page 2 may be compressed and stored as a compressed page 0, a compressed page 1, and a compressed page 2, respectively. With compression, each page is converted (compressed) to a smaller size than its original size, which enables an increase of memory capacity of the system. The higher the compression ratio, the greater the effective memory capacity, and the lower the compression ratio the shorter the decompression time, the better the quality of service (QoS) of the system.

The second most important operation may be a memory management operation. The memory management operation may involve efficiently storing and retrieving compressed data to and from a memory device. Typically, a host manages data in pages, which are usually processed in a fixed size of 1 KB or 4 KB, for example. Data may be managed in different sizes, but it is generally possible to manage data in units of the same size for convenience and efficiency in memory management.

However, in a compressed memory system, even pieces of data having the same size may exhibit variability in content such that pieces of data are compressed to have different sizes according to data their characteristics. For example, referring to FIG. 2A, pages 0, 1, and 2 may be converted into respective compressed pages. Each page may be compressed to a different size according to the characteristics of the data (e.g., amenability to compression), and such variability may be an important factor in the memory management. An effective memory management operation may efficiently manage variable data sizes.

For example, an image file and a text file have different characteristics. Due to this, the image file (typically already compressed) may have a lower compression ratio (lower compressibility) than that of the text file, and such a difference between the pieces of data may make memory allocation and management difficult. The memory management operation performs an important function to handle such variability, thereby enabling optimized utilization of memory resources.

Figure 2B:
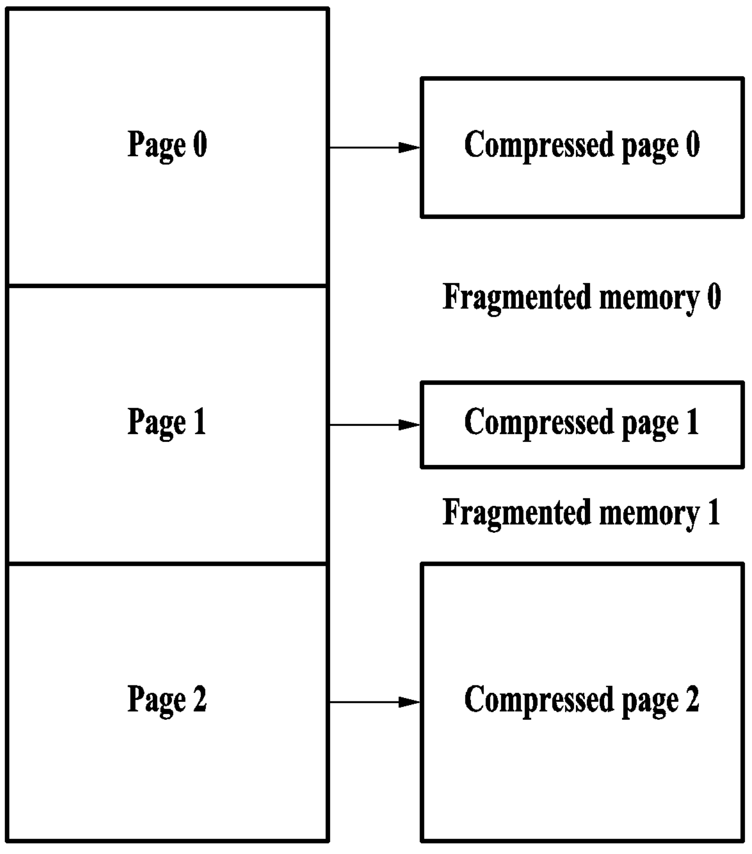

FIG. 2B illustrates an example of a compressed page and a fragmented memory, according to one or more embodiments.

The variability of data size may offset the advantages of page units that the host sets for the memory management. For example, even if the pages have the same size, the compressed pages may be compressed to different sizes according to their data characteristics.

Referring to FIG. 2B, while page 0, the page 1, and the page 2 are compressed into compressed page 0, compressed page 1, and compressed page 2, respectively, memory fragments may be generated due to the size differences between the pages and the compressed pages. Due to this, fragmentation may occur at the memory management level, which may limit the efficient use of the memory device. That is, some memory may be unavailable even though it is not used to store data.

A memory fragment is an unusable memory region that is generated due to a difference in size of a page and a compressed page. That is, referring to FIG. 2B, compressed page 0 and compressed page 1 may result in fragmented memory 0 and fragmented memory 1. The memory may not be efficiently used due to the fragmented memory, which results in wastage of overall memory resources.

If the fragmented memory is not able to be used, it may not be possible to sufficiently obtain the advantages of the compressed memory system, namely, increasing the effective memory capacity through the compression operation. In other words, the performance of the compressed memory system may deteriorate because the benefit of reducing a memory space through compression are diminished.

Therefore, the memory management operation for the compressed memory may be employed to effectively use the fragmented memory. The memory management operation may efficiently reallocate or allocate a fragmented memory region to allow maximum utilization of the overall memory space.

Figure 2C:
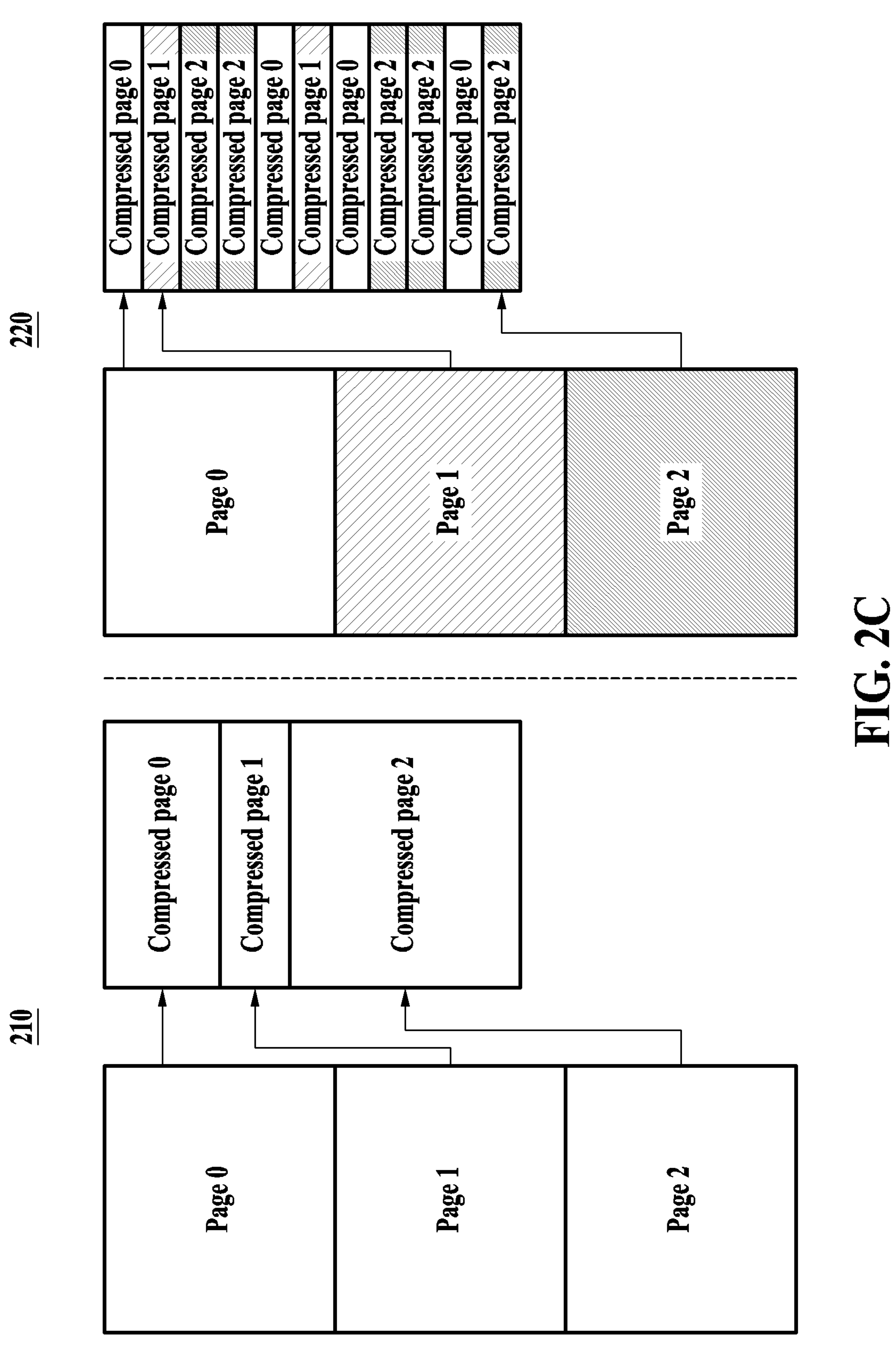

FIG. 2C illustrates an example of a sequential paging method 210 and a fragmented paging method 220, according to one or more embodiments.

The compressed memory management operations may be divided into two methods. The first method is the sequential paging method 210, and the second method is the fragmented paging method 220.

Referring to FIG. 2C, first, the sequential paging method 210 may manage each compressed page to be stored sequentially in a memory based on an uncompressed page. In the sequential paging method 210, the sequence of uncompressed data structure is maintained as much as possible in the compressed data.

For example, in the sequential paging method 210, page 0, page 1, and page 2 are converted into compressed page 0, compressed page 1, and compressed page 2, respectively, and then stored sequentially in the memory in that same order. The sequential paging method 210 has the advantage of simple memory management, but memory fragmentation may occur due to differences in compressed page sizes.

Referring to FIG. 2C, the fragmented paging method 220 may manage the compressed pages non-sequentially by dividing the compressed pages into smaller memory management units (compressed page units).

For example, in the fragmented paging method 220, the compressed page units of each page may be allocated to a non-sequential memory space, and the compressed page units may be stored at different physical positions. In the fragmented paging method 220, page 0, page 1, and page 2 are each divided into compressed page units, and these compressed page units may be stored non-sequentially in the memory (using various filling schemes). The fragmented paging method 220 may have the advantage of using the memory resources more efficiently in a situation where sequential memory allocation has a high level of fragmentation.

The fragmented paging method 220 may be slightly more complex, algorithmically, because it requires an additional memory management unit, however, in terms of memory management, it may reduce memory resource waste since the compressed pages of various sizes may be flexibly disposed.

However, when the fragmented paging method 220 is used, it may be beneficial to efficiently allocate fragmented compressed pages. For example, when a memory allocation policy modifies or moves existing compressed pages, data migration may occur within the memory. The data migration may negatively affect system response time and may cause a decrease in overall system performance. For example, when memory management moves memory-stored data, it may take time to deference (find locations of) all of the corresponding disperse compressed page units and move them individually.

Therefore, the memory management operation of suitably managing the arrangement of the compressed page units may be beneficial, as it may improve the data migration and maintain therefore overall system performance.

Figures 2D, 3:
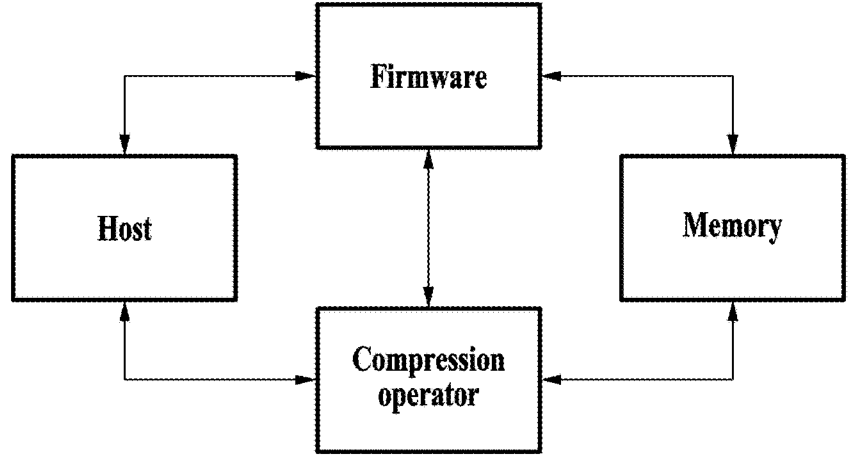
FIG. 3 illustrates an example of slots, according to one or more embodiments.

FIG. 2D illustrates an example of a compressed memory system of the related art.

Data of an application program may be stored in a main memory in the unit of page in a Linux environment, for example. The page size used in Linux is usually 4 KB, however, when some pages are moved to a swap area (swapped out), data is processed through a swap frontend interface.

FIG. 2D shows the general structure of the memory management system. Data may be processed by compressing and storing the data in a compressed memory region within the main memory before the data is moved (swapped out) to a secondary storage device such as a solid-state drive (SSD).

The traditional memory hierarchy consists of a main memory (DRAM) and a relatively slower storage (e.g., disk). In this structure, the main memory may be used as a high-speed ephemeral storage space, and the storage may be used as a large-capacity slow storage space (often non-ephemeral). However, recently, peripheral devices such as Compute Express Link (CXL) memory are also included in the memory hierarchy. CXL memory provides larger capacity than that of the DRAM but a higher speed than that of the storage. Therefore, the CXL memory may function as a buffer between the DRAM and the storage. When data to be swapped out is recognized as cold data with a low usage frequency, the data may be stored in a peripheral device such as a CXL memory first before being moved to the storage (swap device).

In the technology of the related art, a method of operating an address translation algorithm that translates a host physical address into a compressed memory physical address using firmware has been used for the compressed memory management.

Referring to FIG. 2D, the host may process data with a memory and a compression operator through firmware, thereby performing the memory management. A firmware-based address translation method has the advantage of being able to operate flexibly even when the algorithm is complicated.

However, if the complexity of the algorithm is high, the operation may be performed by firmware, but there may be a disadvantage that system response latency may be worsened compared to a dedicated hardware-based method.

For example, referring to FIG. 2D, the host transmits data to the compression operator, and the operation is processed through firmware. The firmware may flexibly process a variety of operations, but may cause latency in the system performance compared to dedicated hardware.

Therefore, in the compressed memory system, an appropriate balance between firmware and hardware may be helpful to maintain high performance, and it may be beneficial to find an optimal solution between the flexibility of firmware-based operations and the speed of hardware-based processing.

FIG. 3 illustrates an example of slots, according to one or more embodiments.

The description provided with reference to FIGS. 1 to 2D is generally applicable to FIG. 3.

Slots 300 according to an example may be used in basic units for memory management in the compressed memory device 100 of the example described above. The slots 300 may be a means for dividing and managing variable-sized compressed data into units of the same size. The compressed memory device 100 may provide a structure for preventing/reducing memory fragmentation and may increase the efficiency of data management by using the slots 300.

The slots 300 according to an example may be configured to facilitate management of compressed data that may be stored non-sequentially in a system using the fragmented paging method (compressed page units). In the fragmented paging method, a compressed page may be divided into slots and distributed to various positions in a memory, and each slot may have a unique physical address. For example, referring to FIG. 3, each slot, such as slot 0, slot 1, and slot 2, may be allocated to a specific position in the memory to store data.

The slots 300 according to an example may be used with metadata to track the storage positions and states of compressed data. Metadata may contain information including a physical position of data stored in a slot and whether it is allocated, through which the slot allocation device 140 may efficiently provide address information required when storing or searching for (referencing) necessary data.

The slots 300 according to an example are managed using a bitmap. Bits of the bitmap indicate allocation-states of respective slots (whether allocated or not). A bit in the bitmap may be 1 when the corresponding slot is in use/allocated and a 0 when the corresponding slot is empty/unallocated. The slot allocation device 140 may search for unallocated slots based on the bitmap information, and may determine a position where new data may be stored. For example, when slot 3 is unallocated as indicated in the bitmap, the slot allocation device 140 may determine that it may be uses to store data.

In addition, a linked list structure may be used to link/associate the physical position of a slot with the data stored therein. The metadata stored in each slot records a physical address of a corresponding/associated slot, and when a chunk of data (e.g., data of a file) is stored across multiple slots, the slots are linked in order, allowing the data to be reconstructed. For example, when data is stored in slot 0 and a next data piece is stored in slot 1, the slots 300 may be linked through a linked list so that data may be accessed sequentially when the data is searched (e.g., the metadata in slot 0 may link to slot 1).

A process of managing and searching for a slot according to an example may be performed by the slot allocation device 140. The slot allocation device 140 may search for an empty slot using a bitmap, and determine a position where the data is to be stored. In addition, when an allocated slot is no longer in use, the slot allocation device 140 may deallocate the corresponding slot and update the bitmap to allow reuse of the memory resources.

Figure 4:
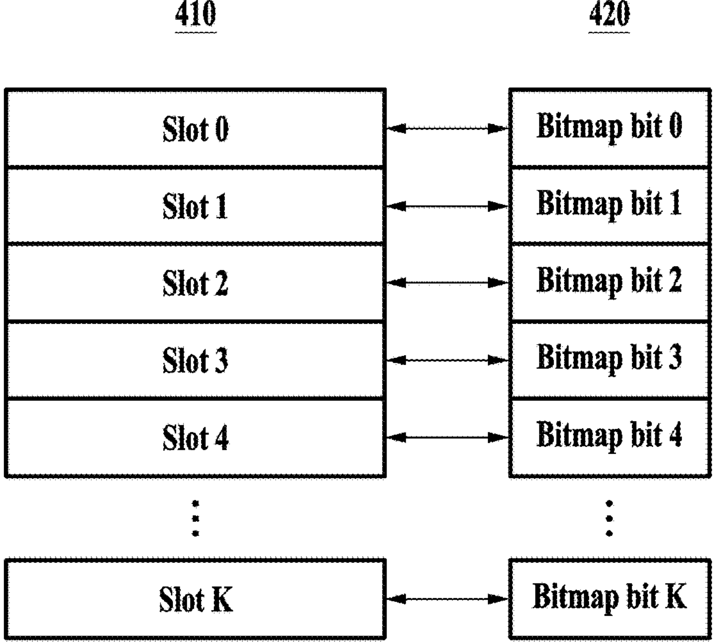
FIG. 4 illustrates an example of a relationship between slots and respective bits in a bitmap, according to one or more embodiments.

FIG. 4 illustrates an example of a relationship between slots and respective bits in a bitmap, according to one or more embodiments.

The description provided with reference to FIGS. 1 to 3 is generally applicable to FIG. 4, and any repeated description related thereto may be omitted.

For slots 410 and bits in a bitmap 420, in the compressed memory device 100, a slot is a basic unit for storing and managing data within a memory, and the bits of the bitmap 420 may be used to track allocated states of the respective slots 410.

The slot allocation device 140 according to an example may manage the allocation states of the slots based on the corresponding bits in the bitmap 420. The bitmap 420 may allow the allocation state of each slot to be checked, thereby allowing searching for unallocated slots. For example, when the slot allocation device 140 searches the bitmap 420 and finds a bit with a bit value of 0 (unallocated), the slot may be selected as a new data storage position. After that, when data has been allocated to the slot (the slot is in an allocated state), the value of the corresponding bit in the bitmap 420 is updated to 1.

The slots 410 are units in which compressed data is stored, and each of the slots 410 has a physical address within the memory. At this time, whether each of the slots 410 is allocated may be managed through the bitmap 420. The bitmap 420 is a data structure composed of bits that represents the states of respective slot, and may represent whether slots are allocated or unallocated using a value of 1 bit.

For example, when a specific slot is allocated to compressed data, the value of the corresponding bit in the bitmap 420 of the slot may be set to 1, and in a case of an unallocated slot, the value of the corresponding bit in the bitmap 420 may be set to 0. As described above, the bitmap 420 may represent current states of the slots in the memory. For example, when slot 0 is in a state where data is stored therein, the value of the corresponding bitmap bit 0 may be set to 1, and when slot 2 is empty, the value of the bitmap bit 2 may be set to 0.

The slots 410 and the respective bits of the bitmap 420 may be managed by the slot allocation device 140. The slot allocation device 140 may search for unallocated slots using information about the bitmap 420, and select an appropriate slot to store data. For example, the slot allocation device 140 may search the bitmap 420 to find an empty slot marked as 0 to determine a position where new data may be stored. In this process, the compressed memory device 100 may track whether the slot is allocated through the bitmap 420.

The bitmap 420 may also be used with a linked list structure. Since each slot may be stored non-sequentially in the memory, the metadata of the compressed data associated with the slot tracks a physical address and an allocated state of the slot in the form of a linked list. For example, when the compressed data is stored in slot 0, the compressed memory device 100 may read the compressed data stored in the slot 0 through the metadata and the linked list.

Figure 5:
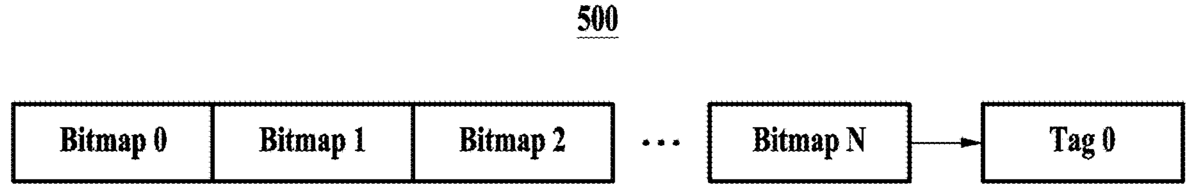
FIG. 5 illustrates an example of a tag, according to one or more embodiments.

FIG. 5 illustrates an example of a tag, according to one or more embodiments.

The description provided with reference to FIGS. 1 to 4 is generally applicable to FIG. 5.

A tag 500 may be a data structure that groups and manages bitmaps in the compressed memory device 100. A bitmap is a data structure that represents the allocated states of the slots and contains information of bits representing whether respective slots are allocated or empty. The compressed memory device 100 may group and manage a bits of a bitmap as single units (groupings) through the tag 500. For example, bitmap bit 0, bitmap bit 1, bitmap bit 2, . . . , bitmap bit N, and the like may be grouped in association with the tag 500 0, and the states of the grouped bits (slots) may be confirmed at once based on the tag 500 0.

The slot allocation device 140 according to an example may quickly identify a grouping of bitmap bits that includes at least one or more unallocated slots through the tag 500. Through the tag 500, the grouping of bitmap bits may be confirmed at once, and a bitmap bit indicating an unallocated slot may be quickly found. For example, when any one of N bitmaps of the tag 500 0 has an unallocated state (a bit value of 0), the tag 500 0 may indicate that the bitmap includes the presence of at least one unallocated slot.

The bitmap grouping represented using the tag 500 may enable the slot allocation device 140 to efficiently search and manage the allocated states of the slots. The slot allocation device 140 may first confirm the tag 500 to find a bitmap grouping (e.g., bitline) including an unallocated slot, and then search for the bitmap grouping in detail to select the unallocated slot. For example, when the bitmap 0 included in the tag 500 0 indicates there is at least one unallocated slot, the slot allocation device 140 may quickly allocate data to the slot through the bitmap bit 0, and then set the bitmap bit 0 to 1.

Figure 6:
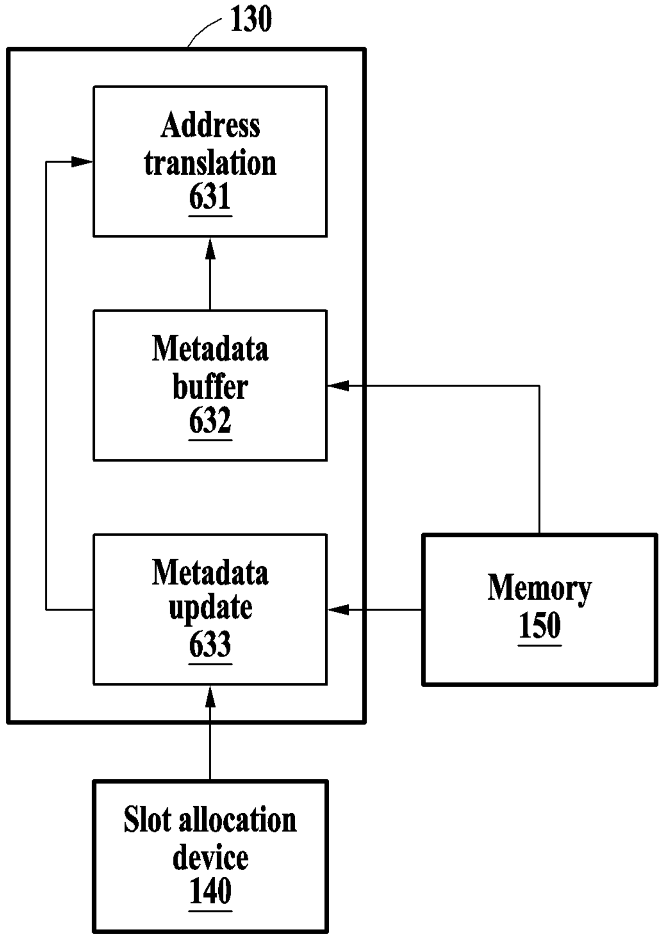
FIG. 6 illustrates an example of an address translator, according to one or more embodiments.

FIG. 6 illustrates an example of an address translator, according to one or more embodiments.

The description provided with reference to FIGS. 1 to 5 is generally applicable to FIG. 6.

Referring to FIG. 6, the address translator 130 may store and search for data between the memory and the slot allocation device 140 in the compressed memory device 100. The address translator 130 may operate differently depending on a WRITE-MODE and a READ-MODE, and may perform each operation when storing data and when searching for data.

The address translator 130 may include a metadata buffer 632, and perform an address translation operation 631 and a metadata update operation 633.

A compressed page may be allocated to multiple slots, and each slot may have any physical address. The address translator 130 may operate in different ways in the WRITE-MODE and the READ-MODE according to a request of the host processor 110 (e.g., a write request or a read request).

In the WRITE-MODE, the address translator 130 may obtain an address of an unallocated slot from the slot allocation device 140. When a request to write is received from the host processor 110, the compressor 120 may need a new slot to store the data after compressing the data. At this time, the address translator 130 may receive an address of an unallocated slot from the slot allocation device 140, and designate a slot in which the data is to be stored.

In the READ-MODE, the address translator 130 may obtain an address of a slot, to which data is already allocated, with reference to the metadata stored in the metadata buffer 632. When a request to read is received from the host processor 110, a slot address, in which the corresponding data is stored, may be obtained from the metadata buffer 632 and the data may be read. The read compressed data may be transmitted to the compressor 120, decompressed, and then transmitted to the host processor 110.

The address translation operation 631 may be an operation in which the address translator 130 interacts with the slot allocation device 140 to manage the slot address. The memory management is performed by obtaining the address of an unallocated slot in the WRITE-MODE and obtaining the address of an allocated slot in the READ-MODE.

For example, in the WRITE-MODE, the address translator 130 may receive the address of an unallocated slot from the slot allocation device 140 and store data, and in the READ-MODE, the data may be searched with reference to the slot address, in which the data is stored, in the metadata buffer 632.

The metadata buffer 632 may temporarily store and manage metadata for data stored in the memory 150 by the address translator 130. The metadata may include information such as an address of a slot in which compressed data is stored, a size of the compressed data, and a state of the compressed data. To elaborate, the slot may store compressed data (exclusive of the metadata), and the metadata may be stored in a separate metadata region. However, the metadata buffer 632 may not be the primary storage location for metadata; rather, the metadata buffer 632 stores a copy of the metadata for fast access. The metadata buffer 632 may enable quick lookups and efficient memory management operations.

The metadata buffer 632 may be used as reference information when storing or reading data. When storing new data in the WRITE-MODE, metadata may be updated in the metadata buffer 632, and when reading data in the READ-MODE, the metadata may be referenced and used to find and read the data.

The metadata update operation 633 may be an operation of updating the metadata when the allocated state of a slot is changed. When new data is allocated to a slot, metadata associated with a physical address of the slot may be updated. For example, in the WRITE-MODE, information about the slot, to which new data is allocated, may be stored in the metadata buffer 632, and the information about the allocated slot may be used to track and manage a position of the data within the memory 150.

In the READ-MODE, compressed data may be searched for by referencing the metadata of the slot in which the data is stored. The metadata may be continuously updated when data is stored and searched by interacting with the slot allocation device 140 and the memory 150.

Figure 7:
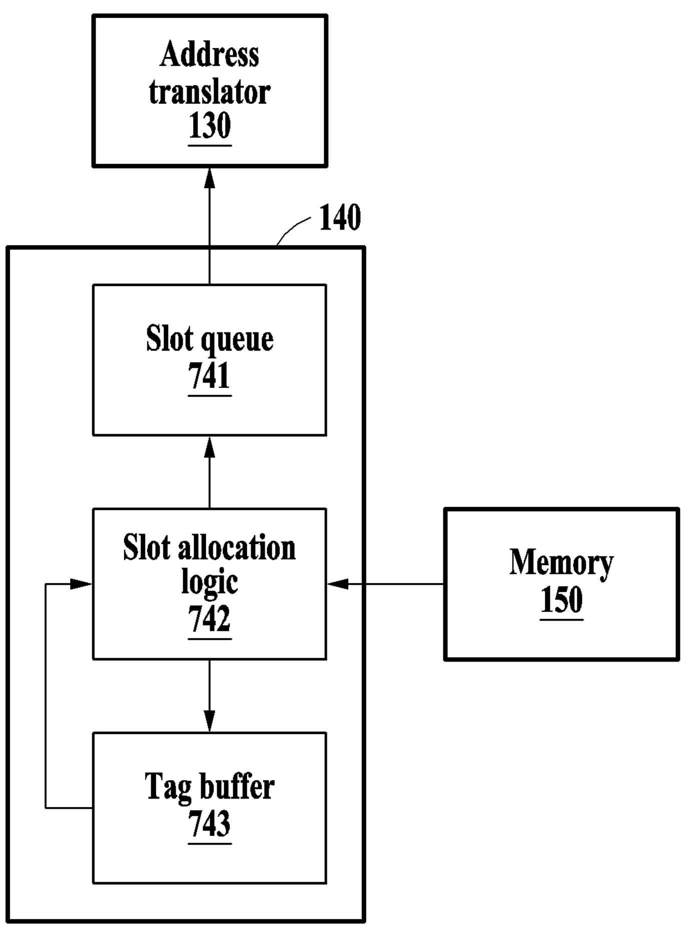
FIG. 7 illustrates an example of a slot allocation device, according to one or more embodiments.

FIG. 7 illustrates an example of the slot allocation device 140, according to one or more embodiments.

The description provided with reference to FIGS. 1 to 6 is generally applicable to FIG. 7.

Referring to FIG. 7, the slot allocation device 140 may manage the allocated state of a slot, allocate a new slot, to which data is to be stored, or release an allocated slot. The slot allocation device 140 may include a slot queue 741 and a tag buffer 743, and perform an operation of a slot allocation logic 742.

The slot allocation device 140 according to an example may allocate and deallocate compressed data to and from a slot using bitmap information indicating whether a slot is allocated. In the slot allocation device 140, the compressed data management system may be managed in the order of: tag→bitmap line→bit→slot.

Through tag information stored in the tag buffer 743, the slot allocation device 140 may detect a bitmap line including/indicating at least one unallocated slot. Based on bitmap line information, the slot allocation device 140 may read a bitmap line, calculate a physical address of an unallocated slot using the bitmap (e.g., mapping the location of an unallocated-indicating bit to the physical address), and then transmit the information to the address translator 130.

The slot queue 741 may store a slot state managed by the slot allocation device 140, and track the allocated and deallocated states of the slot. Each bitmap line may be allocated to the slot queue 741, and the bits in each bitmap line may indicate the allocated states of a set of respective slots.

When a request to write is generated from the host processor 110, the slot queue 741 may search for an allocatable slot (unallocated-indicating bit) with reference to the bitmap line at the front/head of the queue, flip the corresponding bit (set it as "allocated"), and calculate the physical address of the corresponding slot. When all slots of the bitmap line indicate the allocated state, the bitmap line may be dequeued at the slot queue 741, and a new bitmap line may be enqueued to search for an allocable slot.

The slot allocation logic 742 may also be referred to as an allocation and deallocation algorithm of the slots of the slot allocation device 140. When a request to write is generated, the slot allocation device 140 may calculate a bitmap line in the slot queue 741 according to the slot allocation logic 742, and detect the physical address of an allocatable slot found via the bitmap line.

When all bits within the bitmap line are allocated, the bitmap line may be dequeued at the slot queue 741, and a new bitmap line may be enqueued.

To select a new bitmap line, the slot allocation device 140 may search for a tag bit that is 0 in the tag buffer 743. A tag bit may be set by computing the AND value of all of the bits in the corresponding bit line. A tag bit that is set to 1 indicates that all slots of the corresponding bit line are allocated, and when the tag bit is 0, it indicates that there is at least one unallocated slot in the corresponding bitmap line. The slot allocation device 140 searches for an unallocated slot and enqueues it into the slot queue 741.

For example, when the request to write is generated from the host processor 110, the slot allocation device 140 may search for a bit of the slot queue 741 according to the slot allocation logic 742 to select an available slot, and store data in the corresponding slot. When all slots are in the allocated state, a new bitmap line may be searched and an allocatable slot may be continuously managed/provided by adding the new bitmap line to the slot queue 741.

The tag buffer 743 may store tag information used to manage the bitmap lines in the slot allocation device 140.

A tag contains information that groups a set of bitmap lines, and may indicate whether at least one bit/slot among each bitmap line is unallocated or whether all slots are allocated. That is, a tag may have a bit for each bitmap line (grouping of bitmap bits); the bits of the tag indicating which of the respective bitmap lines have at least one unallocated slot. The tag buffer 743 may be searched for a tag bit therein that is 0 to find a bitmap line with an unallocated slot (each tag bit representing a respectively corresponding bitmap line).

For example, when a tag bit is 0, it indicates that there is at least one empty slot in the corresponding bitmap line, which allows the slot allocation device 140 to efficiently search for empty slots. In contrast, when a tag bit is 1, it indicates that all slots in the bitmap line are already allocated.

The memory 150 is a space in which slots managed by the slot allocation device 140 are physically located. The slot allocation device 140 may manage slots in the memory 150, and distinguish allocated slots and unallocated slots through a bitmap.

The address translator 130 may receive a slot address from the slot allocation device 140, and perform an operation to read or write data according to the request of the host processor 110. The slot allocation device 140 may provide the physical address of the allocated slot and select a slot in which data may be stored, by interacting with the address translator 130.

Figure 8:
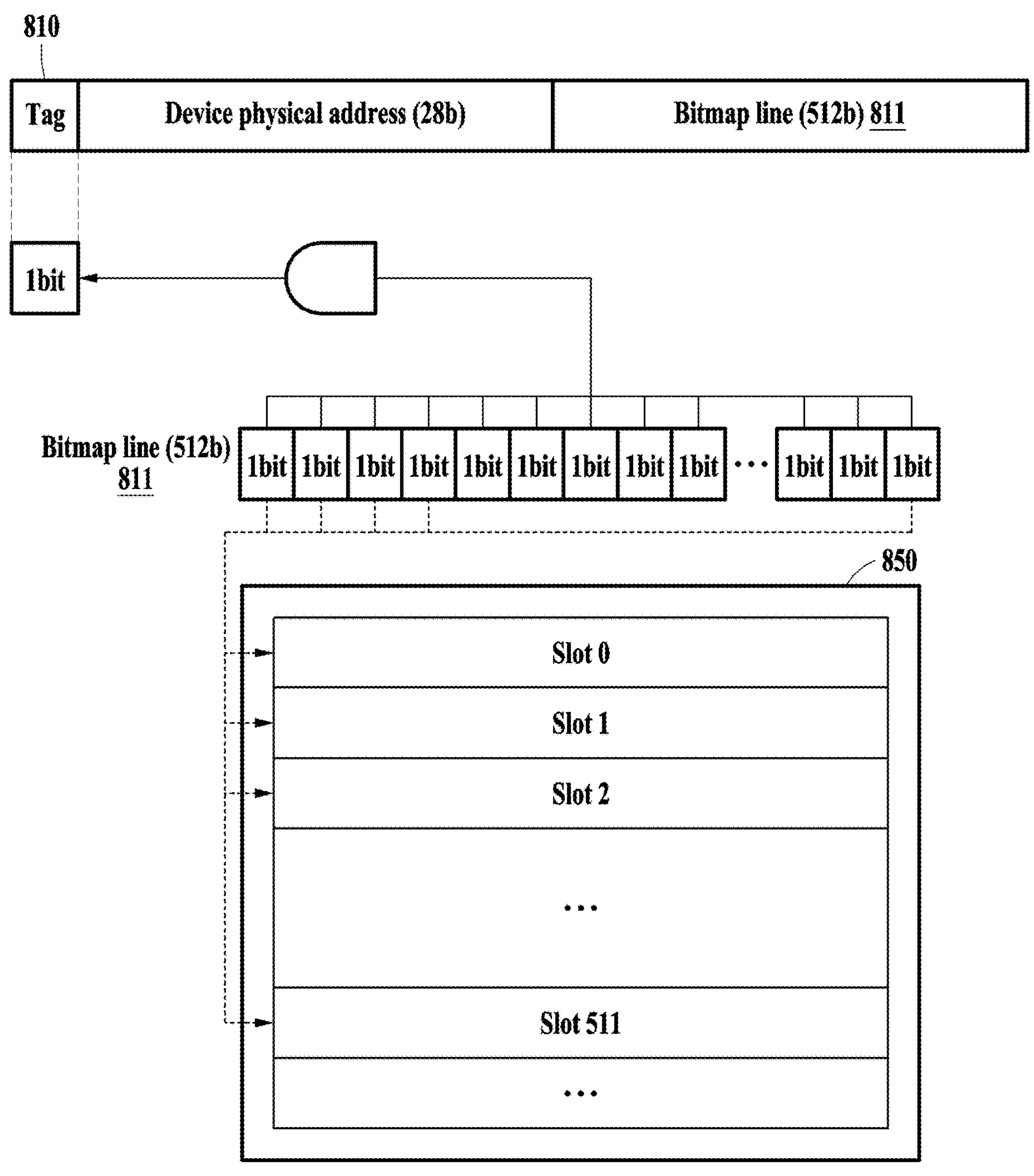
FIG. 8 illustrates an example of a slot queue, according to one or more embodiments.

FIG. 8 illustrates an example of a slot queue, according to one or more embodiments.

The description provided with reference to FIGS. 1 to 7 is generally applicable to FIG. 8.

The slot allocation device 140 according to an example may manage slots of a memory using a tag 810 and a slot queue 850. A bitmap line 811 may be stored in an external memory such as a DRAM or a processing near memory (PNM), and its bits may indicate the allocated states of respective slots.

Referring to FIG. 8, the slot allocation device 140 may manage the slot queue 850 using the tag 810 and the bitmap line 811.

The slot allocation device 140 according to an example may enqueue a bitmap line into the slot queue 850, and each bitmap line may be associated with a set of slots and may include bits indicating the allocated states of the respective slots in the set. The slot queue 850 may enqueue the bitmap line, and adjust allocation and deallocation of data for the slot.

The bitmap line consists of a plurality of bits (e.g., 512 bits), and each bit may represent the allocation state (allocated or non-allocated) for one corresponding slot. Since each bitmap line is associated with a physical offset address, the slot allocation device 140 may calculate the address of the allocated slot, for example, based on (e.g., adding) the physical offset address of the bitmap line and the offset, in the bitmap line, of the bit corresponding to the allocated slot.

When a slot request is generated and the address translator 130 requests a slot allocation from the slot allocation device 140, the slot queue 850 may search for an unallocated slot (a bit of 0) in the bitmap line. When the bit of 0 is found in the bitmap line, the slot queue 850 may calculate a physical address of the corresponding slot based on the physical offset address and the position (within the bitmap line) of the found bit. The slot queue 850 may transmit the calculated physical address of the slot to the address translator 130. After that, the bitmap bit may be updated to 1 to indicate that the slot is in use. Then, the slot allocation device 140 may update the tag bit of the corresponding bitmap line. If all slots are allocated, the tag bit is updated to 1, otherwise, the tag bit remains 0, indicating that additional slots represented by the bitmap line are available (there is at least one 0-bit in the bitmap line).

When the updated tag bit becomes 1, the corresponding bitmap line is dequeued at the slot queue 850. When the tag bit is 1, this indicates that all slots corresponding to the one tag bit have been allocated, and thus, there are no more allocatable slots for the bitmap line at the head of the queue. After the bitmap line is dequeued, a new bitmap line is enqueued into the slot queue 850. A buffer of the tag 810 is searched for a new bitmap line, and adds a bitmap line with a tag bit of 0 to the slot queue 850 so as to continuously manage unallocated slots.

The bitmap line 811 may be stored in an external memory such as a DRAM or a PNM. Each bitmap may represent the allocated state of a slot, and the slot queue 850 and the slot allocation device 140 may manage the slot by referring to bitmap information stored in an external memory.

Figure 9:
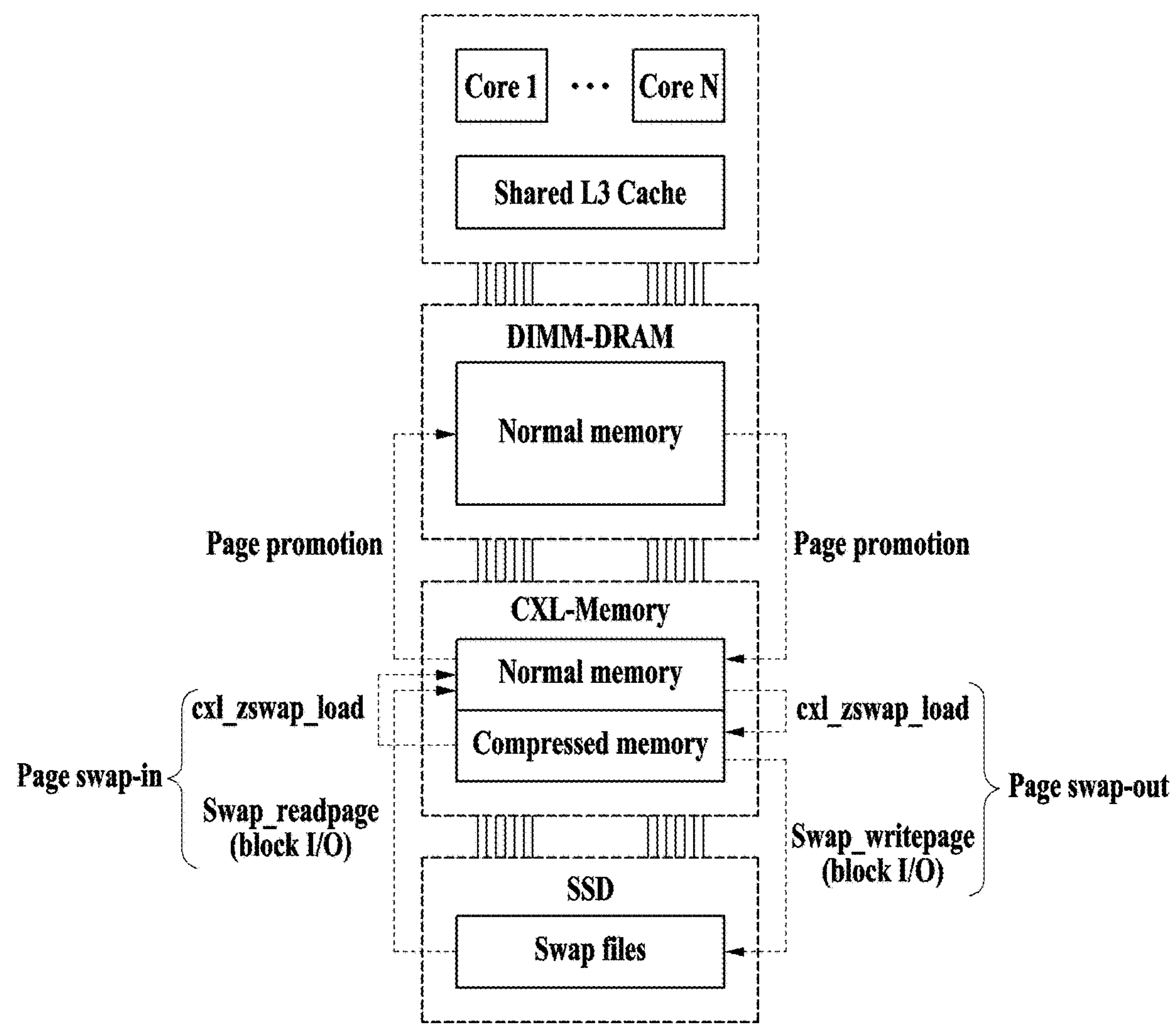
FIG. 9 illustrates an example of a compressed memory system, according to one or more embodiments.

FIG. 9 illustrates an example of a compressed memory system, according to one or more embodiments.

The description provided with reference to FIGS. 1 to 8 is generally applicable to FIG. 9.

Referring to FIG. 9, an example of a compressed memory system operating in a tiered/hierarchical memory system is shown. The hierarchical memory system of FIG. 9 may be an example of an operation of the compressed memory device 100 in the context of a dual in-line memory module (DIMM) and a CXL memory. The compressed memory system may expand memory capacity and improve memory management efficiency by compressing data. Further regarding the address translator 130 and the slot allocation device 140, the address translator 130 and slot allocation device 140 may be part of the compressed memory region within the CXL-Memory, as depicted in FIG. 9. These components may facilitate efficient memory management by handling address translation and slot allocation dynamically. To optimize zSwap operations within the tiered memory system, compressed memory in the CXL-Memory may employ bitmap-based slot allocation. The slot allocation device 140 may determine available slots using bitmaps, and the address translator 130 may retrieve the corresponding slot addresses, updates metadata, and may map that data for data storage and retrieval, thereby minimizing excessive page migrations. This approach may allow zSwap operations to be offloaded to the CXL-Memory, thus reducing CPU overhead and improving memory bandwidth efficiency. Since multiple channels exist within the DIMM/CXL Memory architecture, each can manage zSwap spaces independently, which facilitates parallel processing.

For example, the compressed memory device 100 may be disposed on a CXL memory layer together with a normal memory. The compressed memory device 100 may expand available capacity of a memory by compressing data and storing the data in a smaller size (e.g., smaller than the page size). When a memory write request is generated from the host processor 110, the system may perform a compression operation before storing the data in the compressed memory device 100. A compressor may compress data to save a memory space, and store the data in a compressed form in a compressed memory. Since the compressed memory stores data in a compressed state, a larger amount of data may be stored in the same physical memory space.

zSwap is a compressed swap technology that operates with the compressed memory device 100 to maximize the utilization of memory resources. A zSwap operation may be performed by compressing and storing data through the compressed memory device 100, and decompressing the data again when necessary.

zSwap offloading is processed by performing offloading operations (e.g., compression/decompression) to the compressed memory device 100 present in a CXL memory. This may reduce the burden of compression and decompression operations on a host CPU, and accelerate memory compression operations.

The CXL memory may be composed of multiple channels, each channel may receive a compressed memory region and process data in parallel. Accordingly, a large amount of data may be compressed simultaneously, thereby securing a space capable of storing a larger amount of data.

Figure 10:
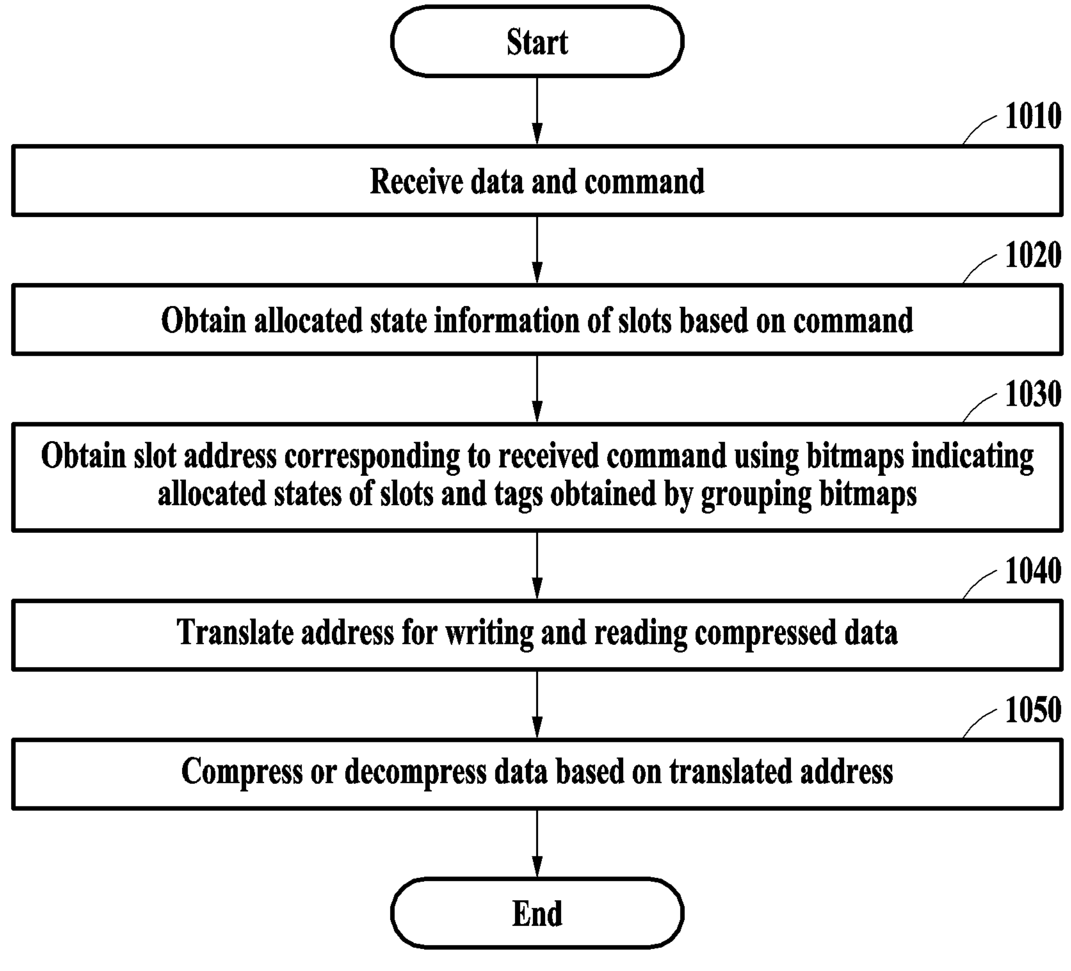
FIG. 10 illustrates an example of operations of a compressed memory device, according to one or more embodiments.

FIG. 10 illustrates an example of operations of a compressed memory device, according to one or more embodiments.

The description provided with reference to FIGS. 1 to 9 is generally applicable to FIG. 10.

In operation 1010, the compressed memory device 100 may receive data and a command from the host processor 110.

In operation 1020, the compressed memory device 100 may obtain allocated state information of slots based on the command.

In operation 1030, the compressed memory device 100 may obtain a slot address corresponding to the received command using bitmaps indicating allocated states of the slots and tags obtained by grouping the bitmaps.

When a request to write is received from the host processor 110, the compressed memory device 100 according to an example may receive an address of a new slot, to which data compressed by the compressor 120 is to be allocated, from the slot allocation device 140, and update metadata of the compressed data.

When a request to read is received from the host processor 110, the compressed memory device 100 according to an example may obtain a physical address of a slot, to which compressed data corresponding to the request to read is allocated, from metadata of the compressed data.

The compressed memory device 100 according to an example may search for a slot, to which data is not allocated, using the bitmap bits, and transmit a physical address of the searched/found slot to the address translator 130.

The compressed memory device 100 according to an example may identify a bitmap bit indicating a slot to which data is not allocated, and may do so using a tag obtained by grouping the bits of the bitmap (e.g., in bitmap lines).

Each of the slots may have a variable memory size, and the slot allocation device 140 may manage each of the slots through the bitmap.

The compressed memory device 100 according to an example may manage slots to which the data is allocated, and slots to which data is not allocated, through the bitmap using the slot queue 741, and search the bitmap for addresses/locations of the slots.

The compressed memory device 100 according to an example may search for a bit corresponding to a slot to which data is not allocated, and may do so using a tag bit stored in a tag buffer.

When a slot request for storing data is received in the address translator 130, the slot queue 741 may be searched using the tags.

When a corresponding bit is identified according to the search result, the slot queue 741 may calculate a physical address of the identified bit's slot (to which the data is to be allocated), and may do so using a physical offset address and a position of the bit within the bitmap.

The slot queue 741 may transmit the calculated physical address to the address translator 130, and may update the bit (in the bitmap) of the slot corresponding to the physical address.

The slot queue 741 may update the corresponding tag bit of the bitmap bit according to the type of update of the bitmap bit; for a write operation, a newly allocated slot's bitmap bit may be updated to 1 (allocated slot) and the tag bit may potentially be updated (to 1 if all of the bits in the corresponding bitmap line have become 1). When the updated tag bit indicates that slots are allocated for all bits in the current bitmap line, the slot queue may dequeue the tag and bitmap line at the slot queue 741.

In operation 1040, the compressed memory device 100 may translate the location of the found bit to an address for writing or reading the compressed data.

In operation 1050, the compressed memory device 100 may compress or decompress the data based on the translated address. In conjunction therewith, the slot's metadata may be updated when a slot is written. The slot allocation device may update the slot allocation status, and the address translator may immediately update the metadata, including the slot addresses. The slot size may be fixed, so, the number of slots required may be determined based on the size of the compressed data. The slot allocation device provides the address translator with the corresponding number of slot addresses, enabling immediate metadata updates. Generally, slots may be sequentially allocated with no wasted space, as long as free slots are available in a contiguous manner. However, since compressed data has variable sizes, the system may allocate non-contiguous slots when necessary. To manage this efficiently, the system may use bitmaps and tag buffers to track slot allocations dynamically. The bitmap ensures that quick identification of unallocated slots, and the tag buffer helps group multiple bitmap entries for efficient slot searching. Therefore, while the allocation tries to minimize wasted space, the slot assignment may not be strictly sequential in all cases due to the variability of compressed data sizes.

The examples described herein may be implemented using a hardware component, instructions, and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software (e.g., reading/writing from/to compressed memory). The description of a processing device as singular is a non-limiting example; a processing device may include multiple processing elements and/or multiple types of processing elements. For example, a processing device may include multiple processors or a processor and a controller. In addition, different processing configurations are possible, such as parallel processors.

Software (instructions/code) may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like (but not a signal per se). Examples of program instructions include both machine code, such as produced by a compiler, and files containing higher-level code that may be executed by the computer using an interpreter.

The computing apparatuses, the electronic devices, the processors, the memories, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as a multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A compressed memory device comprising processing hardware configured to:

receive a memory command from a host processor, and compress or decompress data of the memory command;

perform address translation for writing or reading of the data of the memory command; and provide allocated-state information indicating allocation states of respective slots of the compressed memory for the address translation, and manage allocation and deallocation of the slots, wherein the managing allocation and deallocation of the slots includes providing a slot address corresponding to the memory command of the host processor for the address translation by using bits of a bitmap indicating allocated states of the respective slots and tags representing respective groupings of the bits in the bitmap.

2. The compressed memory device of claim 1, wherein, based on the memory command being a write command, receiving an address of a new slot, to which is allocated data of the write command compressed by the compressed memory device, and updating metadata of the compressed data.

3. The compressed memory device of claim 1, wherein, based on the memory command being a read command, a physical address of a slot is obtained, the slot being where compressed data corresponding to the read command is already allocated, the physical address of the slot being obtained from metadata of the compressed data.

4. The compressed memory device of claim 1, a slot, to which data is not allocated, is searched for using the bits of the bitmap, and a physical address of the searched-for slot is translated.

5. The compressed memory device of claim 1, wherein a bitmap representing a slot to which data is not allocated is identified using a tag whose bits represent the groupings of the bits of the bitmap, respectively.

6. The compressed memory device of claim 1, wherein each of the slots has a variable memory size, and each of the slots is managed through the bitmap.

7. The compressed memory device of claim 1, wherein a tag buffer is used to search the bitmap for a bit corresponding to a slot to which data is not currently allocated, using a tag bit stored in the tag buffer.

8. The compressed memory device of claim 1, further comprising a slot queue configured to manage slots to which data is allocated and slots to which data is not allocated, through the bitmap, and the bitmap is searched to determine addresses of the slots.

9. The compressed memory device of claim 8, wherein, in response to a slot request for storing data being received, the slot queue is configured to search for the tags.

10. The compressed memory device of claim 9, wherein the slot queue is configured to, in response to a bit in the bitmap being identified according to the search result, calculate a physical address of a slot, to which the data is to be allocated, using a physical offset address and a position of the bit in the bitmap.

11. The compressed memory device of claim 10, wherein the slot queue is configured to provide the calculated physical address for address translation, and update, in the bitmap, a bit of a slot corresponding to the physical address.

12. The compressed memory device of claim 11, wherein the slot queue is configured to update the tag bit according to an update of the bitmap bit, and in response to there being no bits in the bit's grouping indicating an unallocated slot, update the tag bit to indicate that all slots of the grouping are allocated, and dequeue the tag from the slot queue.

13. A method of managing compressed memory, the method comprising:

receiving a memory command to read compressed data from the compressed memory by decompression thereof by the compressed memory or to write data that is to be compressed and stored by the compressed memory;

obtaining, based on the memory command, allocated-state information indicating allocation states of respective slots of the compressed memory;

obtaining a slot address of a slot corresponding to the received memory command using bits of a bitmap indicating allocation states of the respective slots and using tags of respective groupings of the bits in the bitmap;

translating, based on the obtained slot address, an address for writing or reading the data of the memory command; and compressing or decompressing the data of the memory command based on the translated address.

14. The method of claim 13, wherein the obtaining of the slot address comprises:

in response to the memory command being a write command, receiving an address of a new slot, to which compressed data is to be allocated, and updating metadata of the compressed data.

15. The method of claim 13, wherein the obtaining of the slot address comprises:

in response to the memory command being a read command, obtaining a physical address of a slot, to which compressed data corresponding to the request to read is allocated, from metadata of the compressed data.

16. The method of claim 13, wherein the obtaining of the slot address comprises:

searching for a slot, to which data is not allocated, using the bits of the bitmap, and performing address translation on a physical address of the found slot.

17. The method of claim 13, wherein the obtaining of the slot address comprises:

identifying a bit in the bitmap indicating a slot to which data is not allocated, using a tag of the groupings of the bits in the bitmap.

18. The method of claim 13, wherein the obtaining of the slot address comprises:

managing slots to which the data is allocated and slots to which data is not allocated through the bitmap using a slot queue, and searching for addresses of the slots.

19. The method of claim 13, wherein the memory command is a write command for writing a memory page, and wherein the memory page is stored in multiple of the slots.

20. An electronic device comprising:

a host processor;

a compressed memory configured to receive a memory command and a compressor configured to compress or decompress data associated with the memory command;

an address translator configured to perform address translation for writing or reading of the data associated with the memory command;

a slot allocation device configured to provide allocated-state information of slots in the compressed memory to the address translator, and manage allocation of the slots or deallocation of the slots; and the compressed memory configured to store compressed data, and store pieces of information for managing the compressed data, wherein the slot allocation device is configured to transmit a slot address corresponding to a request of the host to the address translator by using bits of a bitmap indicating allocation states of the respective slots and by using tags of respective groupings of the bitmaps.

* * * * *